US 8,009,553 B2

(12) United States Patent
Koyanagi

(10) Patent No.: US 8,009,553 B2
(45) Date of Patent: Aug. 30, 2011

(54) SIGNAL GENERATING APPARATUS AND SIGNAL GENERATION METHOD

(75) Inventor: Kenji Koyanagi, Tokyo (JP)

(73) Assignee: NEC Corporation, Tokyo (JP)

( * ) Notice: Subject to any disclaimer, the term of this patent is extended or adjusted under 35 U.S.C. 154(b) by 891 days.

(21) Appl. No.: 11/988,363

(22) PCT Filed: Jul. 7, 2006

(86) PCT No.: PCT/JP2006/313583
§ 371 (c)(1),
(2), (4) Date: Jan. 7, 2008

(87) PCT Pub. No.: WO2007/007673
PCT Pub. Date: Jan. 18, 2007

(65) Prior Publication Data
US 2009/0080454 A1    Mar. 26, 2009

(30) Foreign Application Priority Data
Jul. 8, 2005  (JP) .................................. 2005-200215

(51) Int. Cl.
*H04J 11/00* (2006.01)
(52) U.S. Cl. ......... 370/208; 370/210; 370/310; 455/522
(58) Field of Classification Search .................. 370/203, 370/204, 208, 210, 310; 455/403, 73, 560, 455/561, 562.1, 103, 120, 125, 127.1, 522, 455/115.3; 375/260
See application file for complete search history.

(56) References Cited

U.S. PATENT DOCUMENTS

| 6,726,297 | B1 | 4/2004 | Uesugi |
| 6,904,078 | B1 | 6/2005 | Abeta et al. |
| 2003/0202460 | A1* | 10/2003 | Jung et al. ..................... 370/208 |
| 2004/0233836 | A1 | 11/2004 | Samasu et al. |
| 2005/0094552 | A1 | 5/2005 | Abe et al. |
| 2006/0104373 | A1* | 5/2006 | Bar-Ness et al. ............. 375/260 |
| 2007/0047431 | A1* | 3/2007 | Nishio et al. .................. 370/203 |

FOREIGN PATENT DOCUMENTS

| JP | 11-205276 | 7/1999 |
| JP | 11-275044 | 10/1999 |
| JP | 11-346203 | 12/1999 |

(Continued)

OTHER PUBLICATIONS

R.W. Baumi et al., "Reducing the peak-to-average power ratio of multicarrier modulation by selected mapping,"Electrics Letters, vol. 32:22, Oct. 1996, pp. 2056-2057.

*Primary Examiner* — Aung S Moe
*Assistant Examiner* — Curtis A Alia
(74) *Attorney, Agent, or Firm* — Foley & Lardner LLP

(57) ABSTRACT

A signal generating apparatus, which is adapted for outputting a multicarrier signal where data are multiplexed with respect to a plurality of subcarriers, includes: a rotation sequence selection signal generator for generating a plurality of rotation sequence selection signal sequences which vary the phase relationship between subcarriers on the basis of a plurality of phase rotation sequences and include the number of samples, which are smaller than that of actual transmission signals; and a minimum peak power signal generator for selecting a signal of which peak power becomes minimum from the plurality of rotation sequence selection signals to generate an actual transmission signal by using a phase rotation sequence multiplied with respect to the selected signal.

17 Claims, 11 Drawing Sheets

FOREIGN PATENT DOCUMENTS

| | | |
|---|---|---|
| JP | 2000-349732 A | 12/2000 |
| JP | 2001-156739 A | 6/2001 |
| JP | 2002-261724 A | 9/2002 |
| JP | 2003-283460 A | 10/2003 |
| JP | 2004-336564 A | 11/2004 |
| JP | 2005-027177 A | 11/2004 |
| JP | 2005-027294 A | 1/2005 |
| WO | WO 99/55033 | 10/1999 |

* cited by examiner

SIGNAL GENERATING APPARATUS AND SIGNAL GENERATION METHOD

This application is the National Phase of PCT/JP2006/313583, filed Jul. 7, 2006, which claims priority to Japanese Application No. 2005-200215, filed Jul. 8, 2005, the disclosures of which are hereby incorporated by reference in their entirety.

TECHNICAL FIELD

The present invention relates to a signal generating apparatus and a signal generation method for generating a multicarrier signal in which data are multiplexed with respect to a plurality of subcarriers, and more particularly to a signal generating apparatus and a signal generation method for generating a multicarrier signal of which peak power has been reduced.

BACKGROUND ART

In a multicarrier transmission system of multiplexing data symbols with respect to a plurality of subcarriers as in the OFDMA (Orthogonal Frequency Division Multiple Access) to simultaneously transmit a plurality of carriers corresponding to respective subcarriers, the plurality of carriers are caused to be of the same phase so that a high power peak takes place. As a result, PAR (Peak to Average power Ratio) becomes large.

A multicarrier signal with a high PAR is greatly distorted by an amplifier with the non-linear input/output relationship in transmitting such a multicarrier signal so that receiving characteristic in receiving such a multicarrier signal is disadvantageously deteriorated. In order to linearly amplify a multicarrier signal with a high PAR, it is necessary to set a large input back-off at a transmitter. However, when an input back-off is enlarged, the maximum transmission power is limited and the limitation of the transmission power directly affects broadness of coverage. In order to attain broad coverage in the multicarrier transmission system, PAR in a multicarrier signal is required to be reduced in order to have ability to attain linear amplification by a small back-off amount.

As a method of reducing PAR, there is a method of multiplying respective subcarrier components by phase rotation coefficients such that carriers are not caused to be mutually of the same phase. For example, in R. W. Bauml et al. "Reducing the peak-to-average power ratio of multicarrier modulation by selected mapping," *Electrics Letters, Vol.* 32, No. 22, pp. 2056-2057, October 1996, there is disclosed a method in which a plurality of phase rotation sequences generated at random are prepared to multiply the same data symbol by phase rotation coefficients forming the plurality of phase rotation sequences to thereby generate a plurality of transmission signals with different transmission waveforms to select a signal of which PAR becomes minimum from these transmission signals thus to reduce PAR. A method of reducing PAR by Bauml et al. will be described below with reference to FIGS. 1 and 2.

Signal generating apparatus 2000 in the related art shown in FIG. 1 includes data symbol information generator 2001, phase rotation sequence generator 2002, data sequence generator 2003, frequency assignment information generator 2004, transmission signal generator 2005, and minimum peak power signal selector 2006. Here, transmission signal generator 2005 includes, as shown in FIG. 2, duplicator 2101, N pieces of rotation sequence multipliers 2102, N pieces of channel allocators 2104, and N pieces of IFFT (Inverse Fast Fourier Transform) units 2106.

In signal generating apparatus 2000 shown in FIG. 1, data symbol information generator 2001 generates data symbol information $S_{DI}$ corresponding to the number of data symbols multiplexed with respect to E subcarriers among F subcarriers which are equal to the number of points of inverse Fourier transform to output data symbol information $S_{DI}$ thus generated, wherein F is an integer equal to 2 or more, and E is a natural number equal to F or less. Phase rotation sequence generator 2002 generates the first to the N-th phase rotation sequences $S_{RT\text{-}1}$ to $S_{RT\text{-}N}$ each including E phase rotation coefficients corresponding to data symbol information $S_{DI}$ on the basis of data symbol information $S_{DI}$ to output those phase rotation sequences. Data sequence generator 2003 generates data symbol sequence $S_{DT}$ including E data symbols corresponding to data symbol information $S_{DI}$ on the basis of data symbol information $S_{DI}$ to output data symbol sequence $S_{DT}$ thus generated. Frequency assignment information generator 2004 generates, as frequency assignment information $S_{CA}$, information corresponding to frequency channels of the first to the M-th subchannels each including D successive subcarriers on the basis of data symbol information $S_{DI}$ to output these information, wherein D and M are natural numbers to satisfy the relation expressed as D×M=E.

In transmission signal generator 2005, as shown in FIG. 2, duplicator 2101 serves to duplicate data symbol sequence $S_{DT}$ by N-sequences to output the first to the N-th data symbol sequence $S_{DT\text{-}1}$ to $S_{DT\text{-}N}$. Rotation sequence multiplier 2102 serves to sequentially multiply data symbols respectively forming the i-th data symbol sequence $S_{DT\text{-}i}$ by phase rotation coefficients forming the i-th phase rotation sequence to thereby generate the i-th phase multiplication data sequence $S_{CR\text{-}i}$ including E data symbols by which phase rotation coefficients are multiplied to output the i-th phase multiplication data sequence $S_{CR\text{-}i}$, wherein i is a natural number equal to N or less. Channel allocators 2104 to 2105 serve to multiplex data symbols of the i-th phase multiplication data sequence $S_{CR\text{-}i}$ with respect to a subcarrier corresponding to frequency assignment information $S_{CA}$ to allow the remaining (F-E) pieces of subcarrier components to be zero to generate the i-th subcarrier multiplexed signal $S_{cc\text{-}i}$ including F subcarriers in total to output the i-th subcarrier multiplexed signals $S_{cc\text{-}i}$. IFFT unit 2106 serves to perform inverse Fourier transform of F-points with respect to the i-th subcarrier multiplexed signal $S_{cc\text{-}i}$ to generate transmission candidate signal sequence $S_{vs\text{-}i}$ on the time axis including F samples to output transmit candidate signal sequence $S_{vs\text{-}i}$ thus generated.

Returning to FIG. 1, minimum peak power signal selector 2006 of signal generating apparatus 2000 selects a signal of which peak power becomes minimum from the first to the N-th transmission candidate signal sequences $S_{VS\text{-}1}$ to $S_{VS\text{-}N}$ to output the signal thus selected as a transmission signal (multicarrier signal $S_{PM}$). This transmission signal is transmitted from, e.g., antenna (not shown).

The transmitting apparatus constructed in this way serves to select a signal of which peak power becomes minimum from a plurality of signals generated by respectively performing inverse-Fourier transform on signals obtained by multiplying subcarrier components by a plurality of phase coefficients, thereby making it possible to reduce peak power in a multicarrier signal.

DISCLOSURE OF THE INVENTION

Problem to be Solved by the Invention

However, in the above-described method of the related art, even in the case where one user uses a portion of subcarriers within the entire band as in the case of upstream linked OFDMA, it is necessary to generate signals with the number of samples, which is the same as that of transmission signals, for each of a plurality of phase multiplication data sequences multiplied by phase rotation coefficients. Namely, since inverse Fourier transform operations with the number of the same number of points as that of the entire band are performed every phase rotation sequence, a large amount of computations are required irrespective of the number of subcarriers that the corresponding user actually uses.

An object of the present invention is to provide a signal generating apparatus capable of reducing, in correspondence with the number of subcarriers used, processing to generate a transmission signal in which PAR has been reduced in the case of multiplexing data symbols with respect to E subcarriers which are sufficiently less as compared to the number F of points of inverse Fourier transform as in the case of OFDMA.

Another object of the present invention is to provide a signal generation method capable of reducing, in correspondence with the number of subcarriers used, processing to generate a transmission signal in which PAR has been reduced in the case of multiplexing data symbols with respect to E subcarriers which are sufficiently less as compared to the number F of points of inverse Fourier transform as in the case of OFDMA.

Means for Solving the Problem

The first object is attained by a signal generating apparatus adapted for outputting a multicarrier signal in which data are multiplexed with respect to plural subcarriers, the signal generating apparatus comprising: resource assignment information generating means for generating, as resource assignment information, information indicating E subcarriers assigned within all F subcarriers which are equal to the number of points of inverse Fourier transform, F being an integer equal to 2 or more, and E being an integer equal to F or less; phase rotation sequence generating means for receiving, as an input, the resource assignment information to extract, from the resource assignment information, the number E of the assigned subcarriers to generate first to N-th phase rotation sequences each of which includes E phase rotation coefficients, N being an integer equal to 2 or more; data sequence generating means for receiving, as an input, the resource assignment information to extract, from the resource assignment information, the number E of the assigned subcarriers to generate one data symbol sequence including E data symbols; rotation sequence selection signal generating means for receiving, as inputs, the first to the N-th phase rotation sequences, the data symbol sequence and the resource assignment information to generate, respectively in correspondence with the first to the N-th phase rotation sequences, the first to the N-th rotation sequence selection signal sequences on a time axis each of which includes G samples, G being a natural number less than F; and minimum peak power signal generating means for receiving, as inputs, the first to the N-th rotation sequence selection signal sequences, the first to the N-th phase rotation sequences, the data symbol sequence and the resource assignment information to select, as an optimum rotation sequence selection signal sequence, a rotation sequence selection signal sequence of which peak power becomes minimum among the first to the N-th rotation sequence selection signal sequences, and generating a transmission signal on the time axis including F samples by using the phase rotation sequence corresponding to the optimum rotation sequence selection signal sequence, the data symbol sequence and the resource assignment information.

In the signal generating apparatus of the present invention, the rotation sequence selection signal generating means serves to, for example, change the phase relationship between subcarriers on the basis of the plurality of phase rotation sequences to generate a plurality of rotation sequence selection signals including the number of samples smaller than that of actual transmission signals. The minimum peak power signal generating means selects, from, for example, a plurality of rotation sequence selection signals, a signal of which peak power becomes minimum to generate an actual transmission signal by using the phase rotation sequence multiplied with respect to the selected signal.

The second object of the present invention is attained by a signal generation method of outputting a multicarrier signal in which data are multiplexed with respect to plural subcarriers, the signal generation method comprising: generating, as resource assignment information, information indicating E subcarriers assigned within all F subcarriers which are equal to the number of points of inverse Fourier transform, F being an integer equal to 2 or more, and E being an integer equal to F or less; extracting the number of E of the assigned subcarriers on the basis of the resource assignment information to generate the first to the N-th phase rotation sequences each including E phase rotation coefficients, N being an integer equal to 2 or more; extracting the number E of the assigned subcarriers on the basis of the resource assignment information to generate one data symbol sequence including E data symbols; generating, respectively in correspondence with the first to the N-th phase rotation sequences, the first to the N-th rotation sequence selection signal sequences on a time axis each including G samples on the basis of the first to the N-th phase rotation sequences, the data symbol sequence and the resource assignment information, G being a natural number less than F; and selecting, as an optimum rotation sequence selection signal sequence, a rotation sequence selection signal sequence of which peak power becomes minimum of the first to the N-th rotation sequence selection signal sequences on the basis of the first to the N-th rotation sequence selection signal sequences, the first to the N-th phase rotation sequences, the data symbol sequence and the resource assignment information to generate a transmission signal on the time axis including F samples by using the phase rotation sequence corresponding to the optimum rotation sequence selection signal sequence, the data symbol sequence and the resource assignment information.

In accordance with the present invention, in the case where there exist a large number of subcarriers where data symbols are multiplexed, when one user uses a portion of subcarriers within the entire band, the number of samples of signals used in selecting a phase rotation sequence of which peak power becomes minimum can be greatly reduced as compared to the number of samples of actual transmission signal. For this reason, the present invention is applied, thereby making it possible to generate a multicarrier signal of which peak power has been reduced by lesser computational amount as compared to the related art method.

In this case, information indicating a phase rotation sequence multiplied with respect to a signal of which peak power becomes minimum is transmitted to a receiver. In this instance, it is necessary that information indicating the phase rotation sequence is caused to be transmitted so that peak power does not become high. For example, information indicating the phase rotation sequence is transmitted by single carrier transmission such as DFT-Spread OFDM or the like in an OFDM symbol corresponding to the time period where no data is multiplexed. In accordance with this processing, it is possible to transmit information indicating the phase rotation sequence at a low peak power without affecting peak power of data part. The receiver demodulates data by using the received information indicating the phase rotation sequence.

In the scope of the present invention, there are also included program for allowing computer to execute the signal generation method according to the present invention, a program product including such a program, a recording media where such a program is stored, and a transmission media for performing transmission of such a program.

DESCRIPTION OF REFERENCE SYMBOLS 1000, 2000 Signal generating apparatus;
1001, 2001 Data symbol information generator;
1002, 2002 Phase rotation sequence generator;
1003, 2003 Data sequence generator;
1004, 2004 Frequency assignment power information generator;
1005, 1500 Rotation sequence selection signal generator;
1006, 1700 Minimum peak power signal generator;
1101, 2101 Duplicator;
1102, 1401, 1801, 2102 Rotation sequence multiplier;
1104 Subgroup channel information generator;
1105 Sample number reduction signal generator;
1107 Envelope approximation combiner;
1201 Subgroup signal generator;
1202 Zero component interpolator;
1204 Reduction-type IFFT unit;
1301, 1701 Minimum peak rotation sequence selector;
1302, 1702, 2005 Transmission signal generator;
1402, 1802, 2104 Channel allocator;
1403, 1803, 2106 IFFT unit;
1507 Carrier frequency approximation combiner;
1601 Carrier phase variation calculator;
1602 Carrier phase variation multiplier;
1604 Adder; and
2006 Minimum peak power signal selector.

BEST MODE FOR CARRYING OUT THE INVENTION

First Exemplary Embodiment

Figure 1:
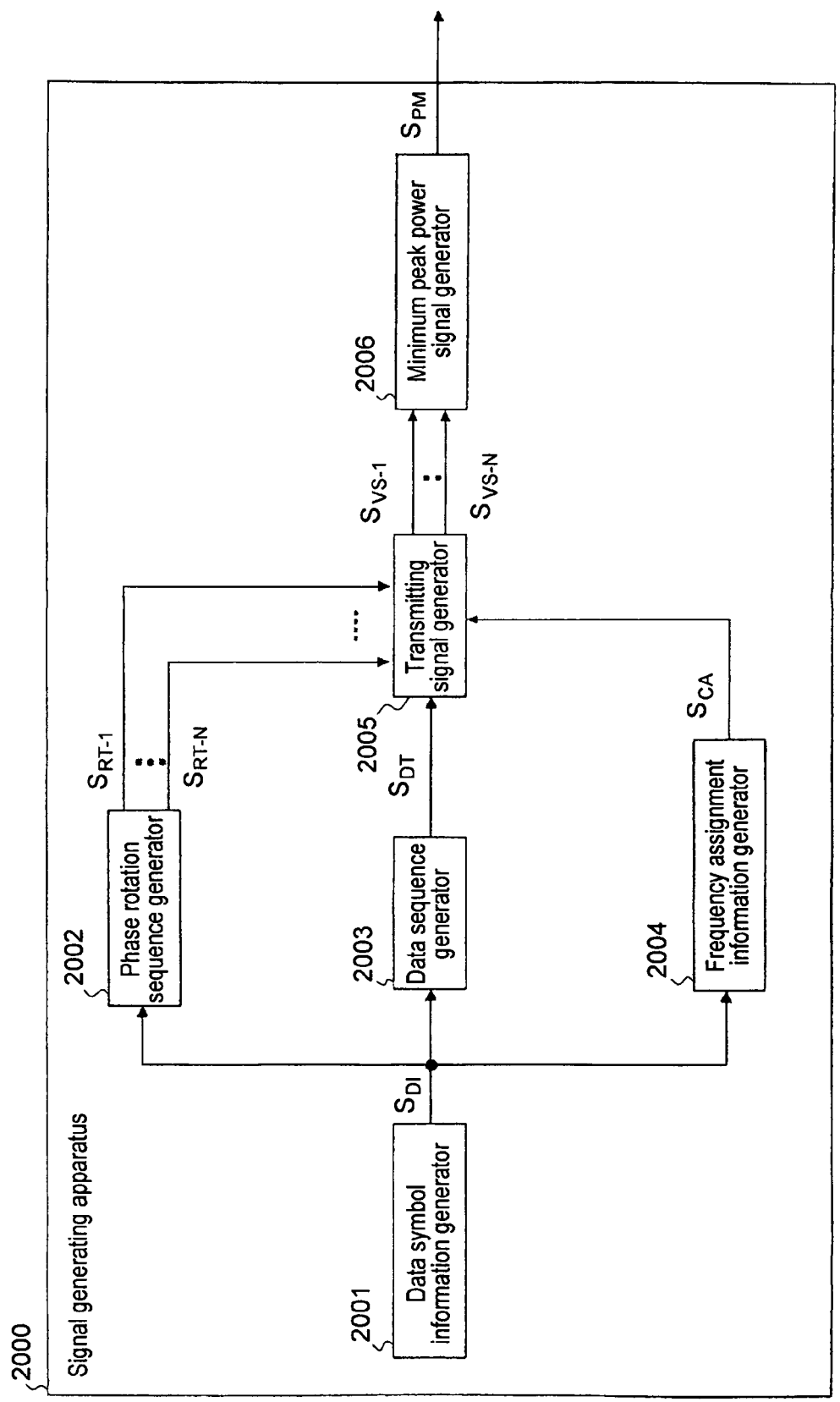
FIG. 1 is a block diagram showing an example of the configuration of a signal generating apparatus in the related art.
Figure 2:
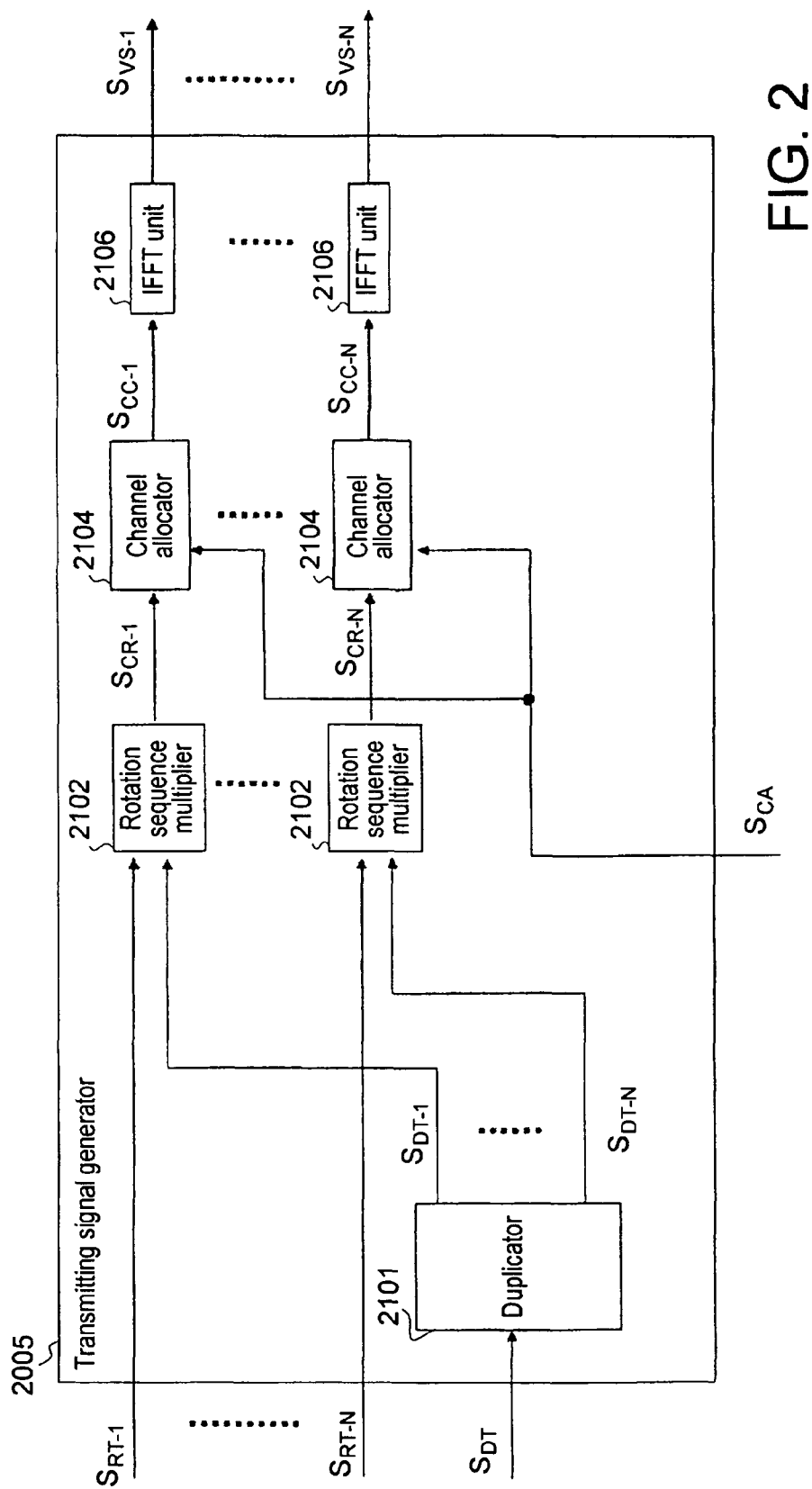
FIG. 2 is a block diagram showing an example of the configuration of a transmission signal generator in the signal generating apparatus of the related art.
Figure 3:
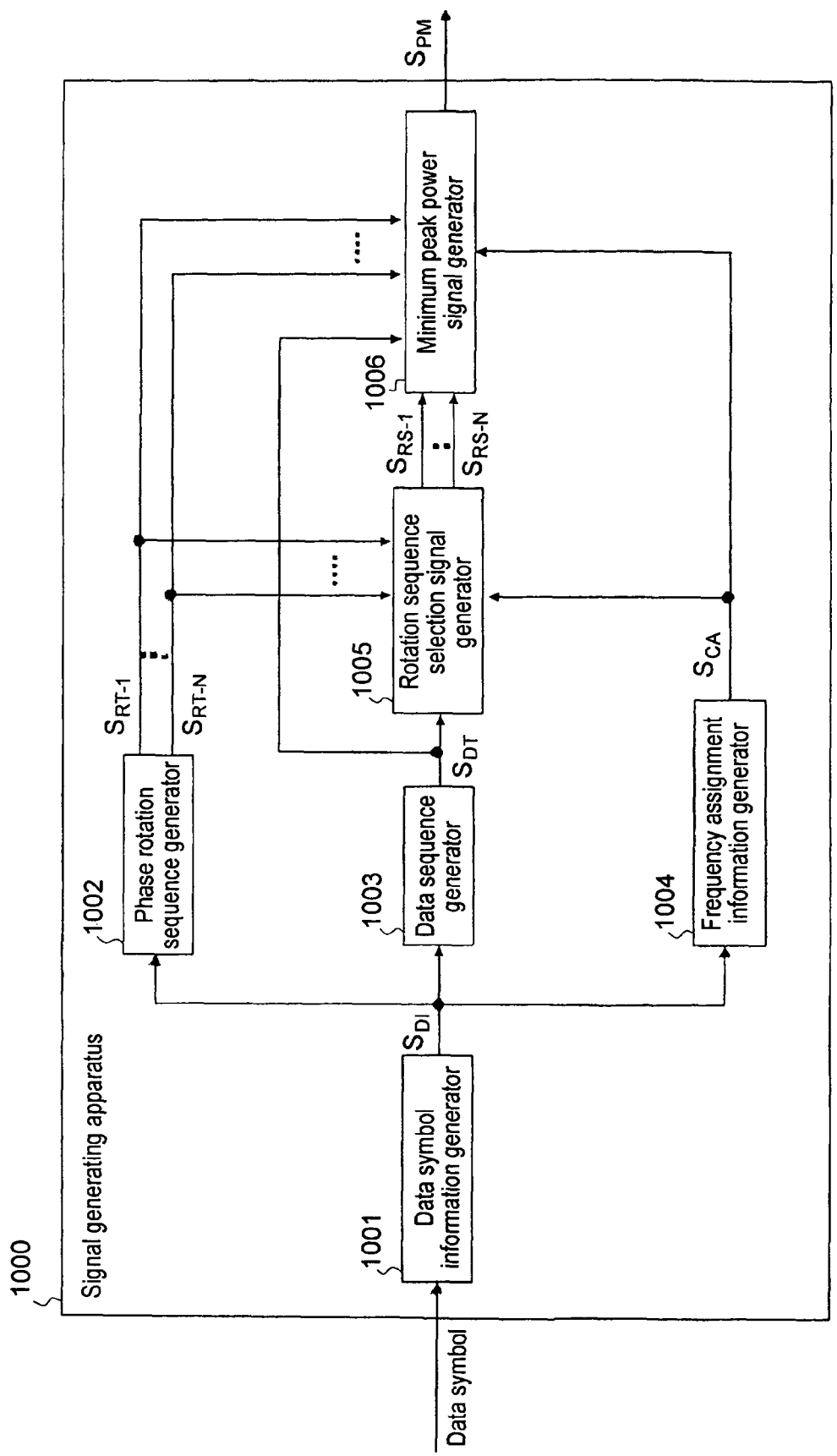
FIG. 3 is a block diagram showing the configuration of a signal generating apparatus according to a first exemplary embodiment of the present invention.

As shown in FIG. 3, signal generating apparatus 1000 according to the first exemplary embodiment of the present invention includes: data symbol information generator 1001 supplied with a data symbol to be transmitted to generate data symbol information $S_{Di}$; phase rotation sequence generator 1002 for generating N phase rotation sequence $S_{RT-1}$ to $S_{RT-N}$ on the basis of data symbol information $S_{Di}$; data sequence generator 1003 for generating data symbol sequence $S_{DT}$ on the basis of the data symbol information $S_{Di}$; frequency assignment information generator 1004 for generating frequency assignment information $S_{CA}$ on the basis of data symbol information $S_{Di}$; rotation sequence selection signal generator 1005 for generating N rotation sequence selection signals $S_{RS-1}$ to $S_{RS-N}$ on the basis of N phase rotation sequences $S_{RT-1}$ to $S_{RT-N}$ and frequency assignment information $S_{CA}$; and a minimum peak power signal generator 1006 for outputting minimum peak power signal $S_{PM}$ on the basis of N phase rotation sequences $S_{RT-1}$ to $S_{RT-N}$, data symbol sequence $S_{DT-N}$ rotation sequence selection signal $S_{RS-1}$ to $S_{RS-N}$, and frequency assignment information $S_{CA}$.

Figure 4:
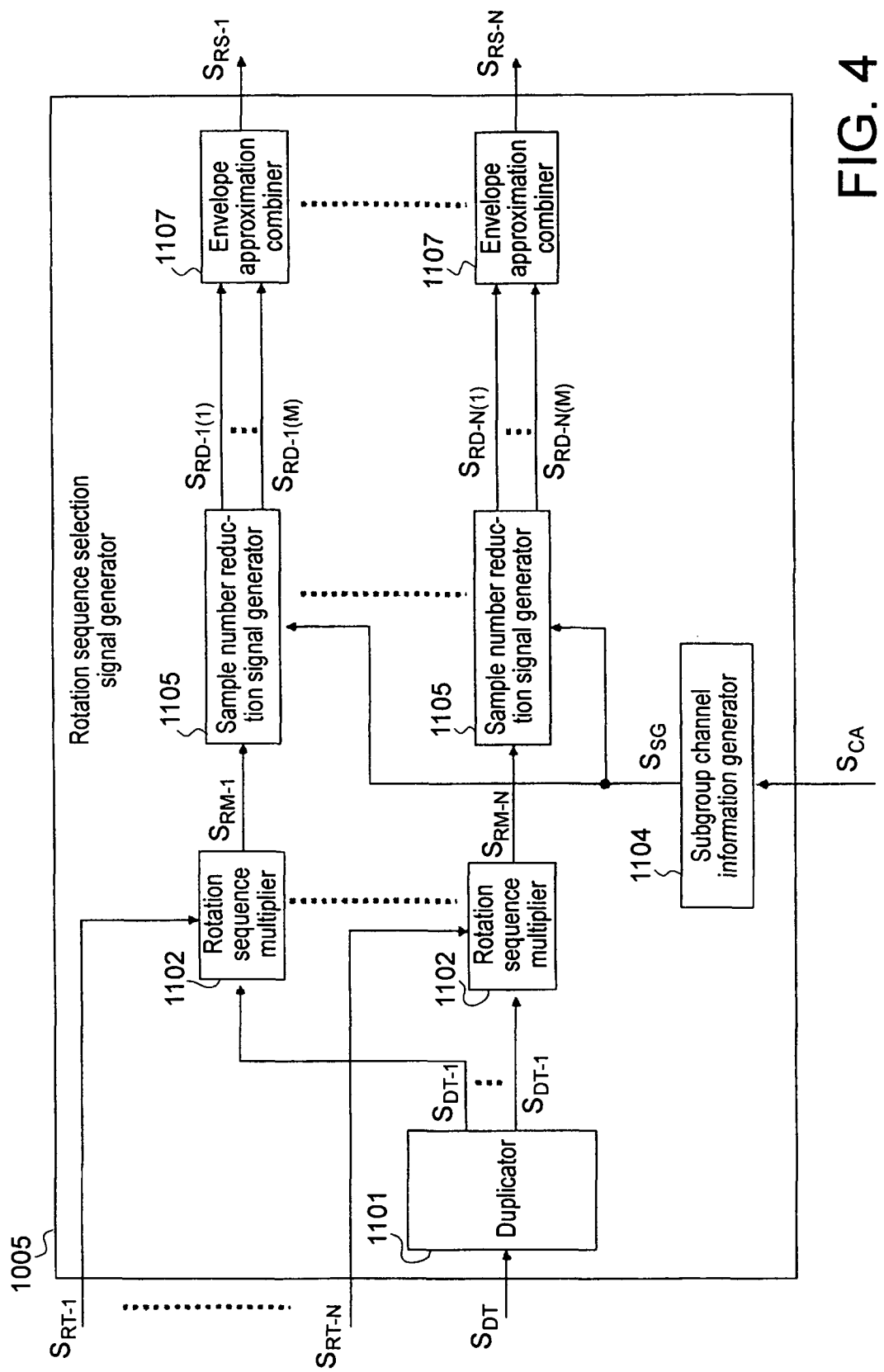
FIG. 4 is a block diagram showing the configuration of a rotation sequence selection signal generator in the signal generating apparatus shown in FIG. 3.
Figure 5:
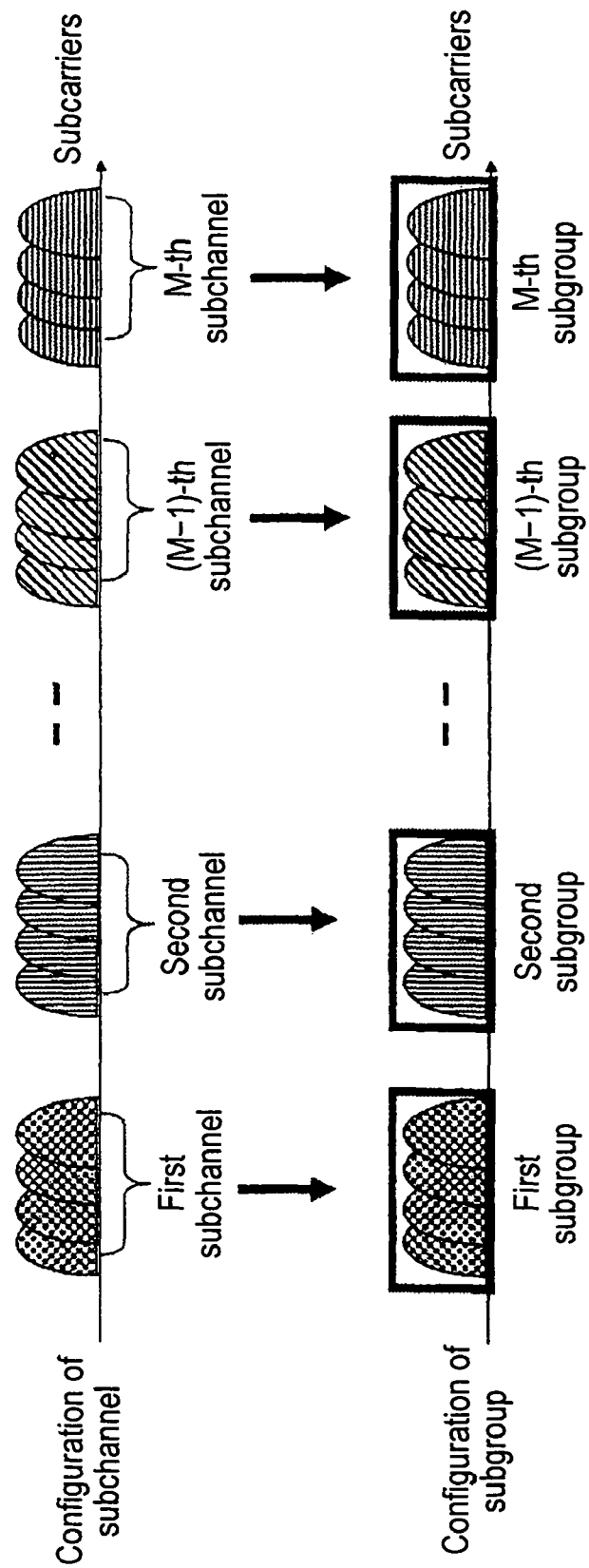
FIG. 5 is a diagram showing the configuration of subgroup channel that a subgroup channel information generator in the rotation sequence selection signal generator shown in FIG. 4 generates.

In this signal generating apparatus 1000, rotation sequence selection signal generator 1005 includes: as shown in FIG. 4, duplicator 1101 for duplicating data symbol sequence $S_{DT}$ to output N data symbol sequences $S_{DT-1}$ to $S_{DT-N}$; N pieces of rotation sequence multipliers 1102 for multiplying data symbol sequences $S_{DT-1}$ to $S_{DT-N}$ and phase rotation sequences $S_{RT-1}$ to $S_{RT-N}$ corresponding thereto to output phase multiplication data sequences $S_{RM-1}$ to $S_{RM-N}$; subgroup channel information generator 1104 for generating subgroup channel information $S_{SG}$ as shown in FIG. 5 on the basis of frequency assignment information $S_{CA}$; N pieces of sample number reduction signal generators 1105 for generating sample number reduction signal sequences $S_{RD-1(1)}$ to $S_{RD-1(M)}, \ldots , S_{RD-N(1)}$ to $S_{RD-N(M)}$ on the basis of phase multiplication data sequences $S_{RM-1}$ to $S_{RM-N}$ and subgroup channel information $S_{SG}$; and N pieces of envelope approximation combiners 1107 for generating rotation sequence selection signals $S_{RS-1}$ to $S_{RS-N}$ on the basis of sample number reduction signal sequences $S_{RD-1(1)}$ to $S_{RD-N(M)}, \ldots , S_{RD-N(1)}$ to $SR_{DN(M)}$.

Figure 6:
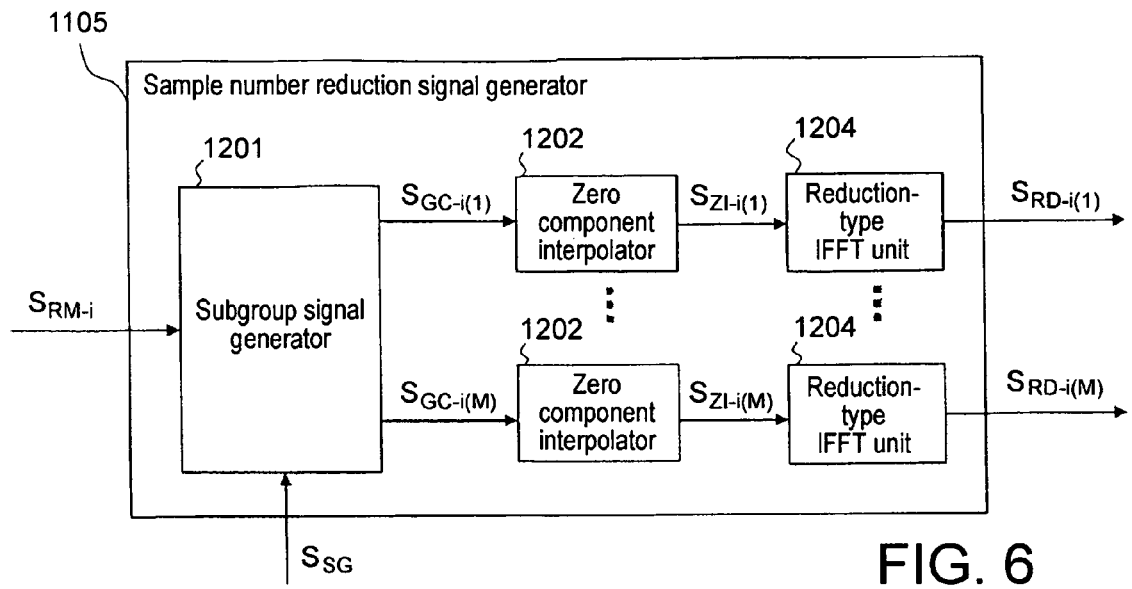
FIG. 6 is a block diagram showing the configuration of a sample number reduction signal generator in the rotation sequence selection signal generator shown in FIG. 4.

While N sample number reduction signal generators 1105 are provided in rotation sequence selection signal generator 1005, those generators are all caused to be of the same configuration. Here, when attention is drawn to the i-th ($1 \leq i \leq N$) sample number reduction signal generator, sample number reduction signal generator 1105 includes: as shown in FIG. 6, subgroup signal generator 1201 for generating M subgroup signal sequences $S_{GC-i(1)}$ to $S_{GC-i(M)}$ from the i-th phase multiplication data sequence $S_{RM-i}$ and the i-th subgroup channel information $S_{SG}$; M pieces of zero component interpolators 1202 for interpolating zero components in subgroup signal sequences $S_{GC-i(1)}$ to $S_{GC-i(M)}$ to generate zero interpolation signal sequences $S_{ZI-i(1)}$ to $S_{ZI-i(M)}$, and reduction-type IFFT units 1204 for performing the reduction-type inverse fast Fourier transform which will be described later with respect to zero interpolation signal sequences $S_{ZI-i(1)}$ to $S_{ZI-i(M)}$ to generate sample number reduction signal sequences $S_{RD-i(1)}$ to $S_{RD-i(M)}$ to output those signal sequences.

Figure 7:
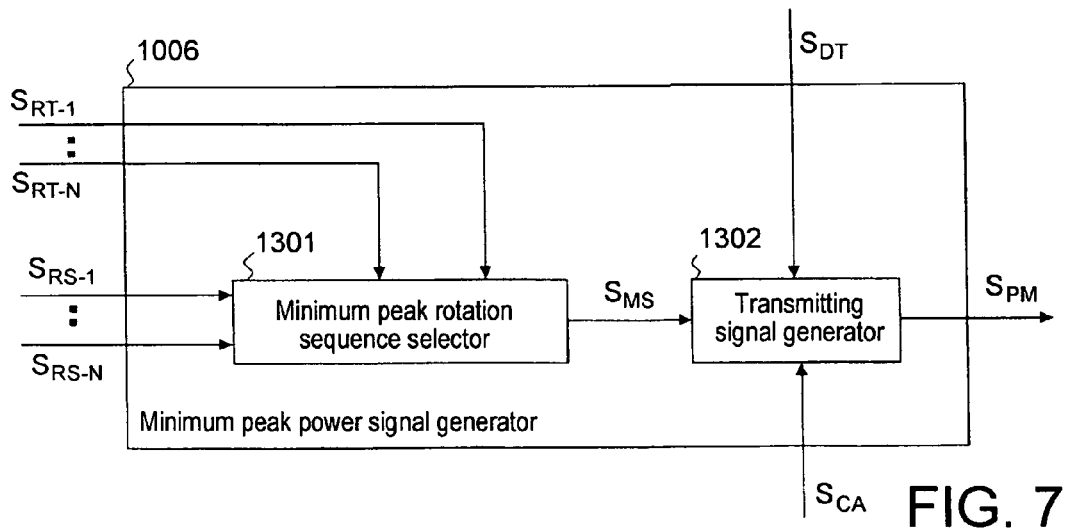
FIG. 7 is a block diagram showing the configuration of a minimum peak power signal generator in the signal generating apparatus shown in FIG. 3.
Figure 8:
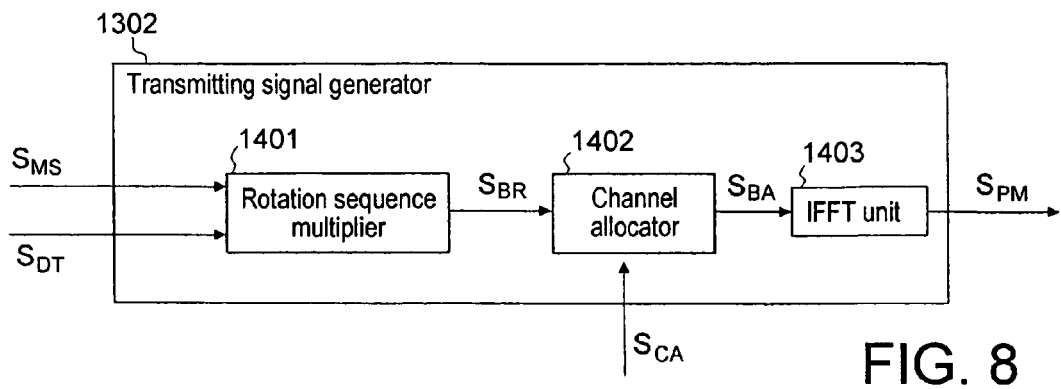
FIG. 8 is a block diagram showing the configuration of a transmission signal generator in the minimum peak power signal generator shown in FIG. 7.

In signal generating apparatus 1000 shown in FIG. 3, minimum peak power signal generator 1006 includes: as shown in FIG. 7, minimum peak rotation sequence selector 1301 supplied with rotation sequence selection signals $S_{RS-1}$ to $S_{RS-N}$ and phase rotation sequences $S_{RT-1}$ to $S_{RT-N}$ to select optimum rotation sequence selection information $S_{MS}$ from rotation sequence selection signals $S_{RS-1}$ to $S_{RS-N}$ to output optimum rotation sequence selection information $S_{MS}$ thus selected; and transmission signal generator 1302 supplied with optimum rotation sequence selection information $S_{MS}$, data symbol sequence $S_{DT}$ and frequency assignment information $S_{CA}$ to output a transmission signal, i.e., multicarrier signal $S_{PM}$. Transmission signal generator 1302 includes: as shown in FIG. 8, rotation sequence multiplier 1401 for generating carrier phase rotation multiplication data sequence $S_{BR}$ from optimum rotation sequence selection information $S_{MS}$ and data symbol sequence $S_{DT}$; channel allocator 1402 for generating IFFT signal $S_{BA}$ including F subcarriers from frequency assignment information $S_{CA}$ and carrier phase rotation multiplication data sequence $S_{BR}$; and IFFT unit 1403 for performing inverse fast Fourier transform with respect to IFFT signal $S_{BA}$ to generate a transmission signal (multicarrier signal $S_{PM}$).

The operation of signal generating apparatus 1000 of the first exemplary embodiment will now be described.

Here, it is assumed that F is an integer equal to 2 or more, and F subcarriers are set within band. Here, the value F is assumed to be equal to the number of points of inverse Fourier transform at IFFT unit 1403 When a data symbol is given, data symbol information generator 1001 generates data symbol information $S_{DI}$ corresponding to the number of data symbols multiplexed with respect to E subcarriers among F subcarriers to output the data symbol information $S_{DI}$. Of course, $E \leq F$ holds. Data symbol information $S_{DI}$ is delivered to phase rotation sequence generator 1002, data sequence generator 1003 and frequency assignment information generator 1004 from data symbol information generator 1001. Phase rotation sequence generator 1002 generates, on the basis of data symbol information $S_{DI}$, the first to the N-th phase rotation sequences $S_{RT-1}$ to $S_{RT-N}$ each including E phase rotation coefficients corresponding to data symbol information $S_{DI}$ to deliver phase rotation sequences $S_{RT-1}$ to $S_{RT-N}$ to rotation sequence selection signal generator 1005 and minimum peak power signal generator 1006. Data sequence generator 1003 generates, on the basis of data symbol information $S_{DI}$, data symbol sequence $S_{DT}$ including E data symbols corresponding to data symbol information $S_{DI}$ to deliver this data symbol sequence $S_{DT}$ to rotation sequence selection signal generator 1005 and minimum peak power signal generator 1006. Frequency assignment information generator 1004 generates, on the basis of data symbol information $S_{DI}$, information corresponding to frequency channels of the first to the M-th subchannels each including D successive subcarriers as frequency assignment information $S_{CA}$ to deliver frequency assignment information $S_{CA}$ to rotation sequence selection signal generator 1005 and minimum peak power signal generator 1006. Here, D and M are natural numbers to satisfy the relation expressed as $D \times M = E$. Here, as shown in FIG. 5, M subchannels are set within band, and each subchannel includes D subcarriers disposed in succession on the frequency axis.

When data symbol sequence $S_{DT}$, frequency assignment information $S_{CA}$ and phase rotation sequences $S_{RT-1}$ to $S_{RT-N}$ are given to rotation sequence selection signal generator 1005, rotation sequence selection signal generator 1005 generates the first to the N-th rotation sequence selection signals $S_{RS-1}$ to $S_{RS-N}$ to deliver these rotation sequence selection signals to minimum peak power signal generator 1006. At this time, in rotation sequence selection signal generator 1005, duplicator 1101 serves to duplicate, by N sequences, inputted data symbol sequence $S_{DT}$ to deliver data symbol sequences thus duplicated to the first to the N-th rotation sequence multipliers 1102 as the first to the N-th data symbol sequences $S_{DT-1}$ to $S_{DT-N}$, respectively. Thus, the first to the N-th rotation sequence multipliers 1102 respectively generate phase multiplication data sequences $S_{RM-1}$ to $S_{RM-N}$ to deliver these phase multiplication data sequences to the first to the N-th sample number reduction signal generators 1105. In concrete terms, assuming that $1 \leq i \leq N$, the i-th rotation sequence multiplier 1102 sequentially multiplies data symbols forming the i-th data symbol sequence $S_{DT-i}$ by phase rotation coefficients forming the i-th phase rotation sequence $S_{RT-1}$ to generate the i-th phase multiplication data sequence $S_{RM-i}$ including E data symbols by which phase rotation coefficients are multiplied in this way to output the i-th phase multiplication data sequence thus generated.

At this time, subgroup channel information generator 1104 generates subgroup channel information $S_{SG}$ from frequency assignment information $S_{CA}$ to output subgroup channel information $S_{SG}$ thus generated to the first to the M-th sample number reduction signal generators 1005. Here, as shown in FIG. 5, the first to the M-th subchannels each including D successive subcarriers are set as frequency channels. In this case, subchannels are grouped on subchannel basis to set the first to the M-th subgroups. Subgroup channel information $S_{SG}$ corresponds to a frequency channel including the first to the M-th subgroups.

Since N sample number reduction signal generators 1105 provided are caused to be of the same configuration, when attention is drawn to the i-th ($1 \leq i \leq N$) sample number reduction signal generator, subgroup signal generator 1201 receives, as an input, the i-th phase multiplication data sequence $S_{RM-i}$ and subgroup channel information $S_{SG}$ at the i-th sample number reduction signal generator 1105 to sequentially multiplex the i-th phase multiplication data sequences $S_{RM-i}$ with respect to subcarriers of the first to the M-th subgroups that subgroup channel information $S_{SG}$ indicates. Further, subgroup signal generator 1201 serves to divide the multiplied sequence into the first to the M-th subgroup signal sequences in correspondence with respective subgroups to thereby generate the $(M \times (i-1)+1)$-th to the $(M \times i)$-th subgroup signal sequences $S_{GC-i(1)}$ to $S_{GC-i(M)}$ each including D subcarriers. M subgroup signal sequences $S_{GC-i(1)}$ to $S_{GC-i(M)}$ are respectively delivered to the first to the M-th zero component interpolators 1202. M zero component interpolators 1202 are supplied with subgroup signal sequences $S_{GC-i(1)}$ to $S_{GC-i(M)}$, respectively, to extrapolate (G–D) pieces of subcarriers of zero component with respect to frequencies of both ends at each subgroup signal sequence to output the subcarriers thus obtained as the (M×(i−1)+1)-th to the (M×i)-th zero interpolation signal sequences $S_{ZI-i(1)}$ to $S_{ZI-i(M)}$ including G subcarriers. Here, G is an integer equal to D or more, and equal to F or less. Reduction-type IFFT units 1204 are respectively supplied with zero interpolation signal sequences $S_{ZI-i(1)}$ to $S_{ZI-i(M)}$ to perform G-points inverse fast Fourier transform, in which the center frequency of inverse Fourier transform is caused to be the center frequency of zero interpolation signal sequence, with respect to the zero interpolation signal sequence including G subcarriers. Thus, at each of reduction-type IFFT units 1204, there is a generated sample number reduction signal sequence on the time axis including G samples. From the first to the M-th reduction-type IFFT units 1204, the (M×(i−1)+1)-th to the (M×i)-th sample number reduction signal sequences $S_{RD-i(1)}$ to $S_{RD-i(M)}$ are respectively outputted.

Sample number reduction signal sequences $S_{RD-i(1)}$ to $S_{RD-i(M)}$ generated in this way are delivered to the i-th (1≦i≦N) envelope approximation combiner 1107. The i-th envelope approximation combiner 1107 receives, as inputs, sample number reduction signal sequences $S_{RD-i(1)}$ to $S_{RD-i(M)}$ to add absolute values every sample at the (M×(i−1)+1)-th to the (M×i)-th sample number reduction signal sequences $S_{RD-i(1)}$ to $S_{RD-i(M)}$ to generate the i-th rotation sequence selection signal $S_{RS-i}$ on the time axis including G samples, and delivers the i-th rotation sequence selection signal $S_{RS-i}$ thus generated to minimum peak power signal generator 1006 as an output of rotation sequence selection signal generator 1005. Since N pieces of envelope approximation combiners 1107 are provided within rotation sequence selection signal generator 1005, the first to the N-th rotation sequence selection signals $S_{RS-1}$ to $S_{RS-N}$ are delivered to minimum peak power signal generator 1006 at last.

At minimum peak power signal generator 1006, minimum peak rotation sequence selector 1301 receives, as inputs, the first to the N-th rotation sequence selection signals $S_{RS-1}$ to $S_{RS-N}$ and the first to the N-th phase rotation sequences $S_{RT-1}$ to $S_{RT-N}$ to select a phase rotation sequence corresponding to a rotation sequence selection signal of which peak power becomes minimum from the first to the N-th rotation sequence selection signals $S_{RS-1}$ to $S_{RS-N}$ to output the selected phase rotation sequence to transmission signal generator 1302 as optimum rotation sequence selection information $S_{MS}$.

When optimum rotation sequence selection information $S_{MS}$, data symbol sequence $S_{DT}$ and frequency assignment information $S_{CA}$ are delivered to transmission signal generator 1302, rotation sequence multiplier 1401 of transmission signal generator 1302 sequentially multiplies data symbols forming data symbol sequence $S_{DT}$ by phase rotation coefficients forming optimum rotation sequence selection information $S_{MS}$ to calculate carrier phase rotation multiplication data sequence $S_{BR}$ including E pieces of data to output a carrier phase rotation multiplication data sequence thus calculated to channel allocator 1402. Channel allocator 1402 outputs, to IFFT unit 1403, as IFFT signal $S_{BA}$, a signal including F subcarriers which is obtained by sequentially multiplying data symbols of carrier phase rotation multiplication data sequences $S_{BR}$ with respect to E subcarriers corresponding to frequency assignment information $S_{CA}$, and causing the remaining (F−E) pieces of subcarrier components to be zero. IFFT unit 1403 performs F-points inverse fast Fourier transform with respect to IFFT signal $S_{BA}$ to thereby generate a signal on the time axis including F samples. This signal is multicarrier signal $S_{PM}$, and is used as a transmission signal.

Optimum rotation sequence selection information $S_{MS}$ is transmitted to a receiver. In this instance, it is necessary that optimum rotation sequence selection information $S_{MS}$ is transmitted in such a manner that peak power does not becomes high. For example, in an OFDM symbol corresponding to the time period in which no data is multiplexed, optimum rotation sequence selection information $S_{MS}$ is transmitted by single carrier transmission such as DFT-Spread OFDM or the like. In accordance with this processing, it is possible to transmit information indicating phase rotation sequence at a low peak power without affecting peak power of data part. The receiver demodulates data by using information indicating received phase rotation sequence.

In the present exemplary embodiment, in the case where one user uses a portion of subcarriers within the entire band of a large number of subcarriers where data symbols are multiplexed, it is possible to reduce, as compared to the number of samples of an actual transmission signal, the number of samples of a signal used in selecting the phase rotation sequence of which peak power becomes minimum. For this reason, it is possible to generate a multicarrier signal of which peak power has been reduced by lesser computational amount as compared to the related art method.

Second Exemplary Embodiment

Figure 9:
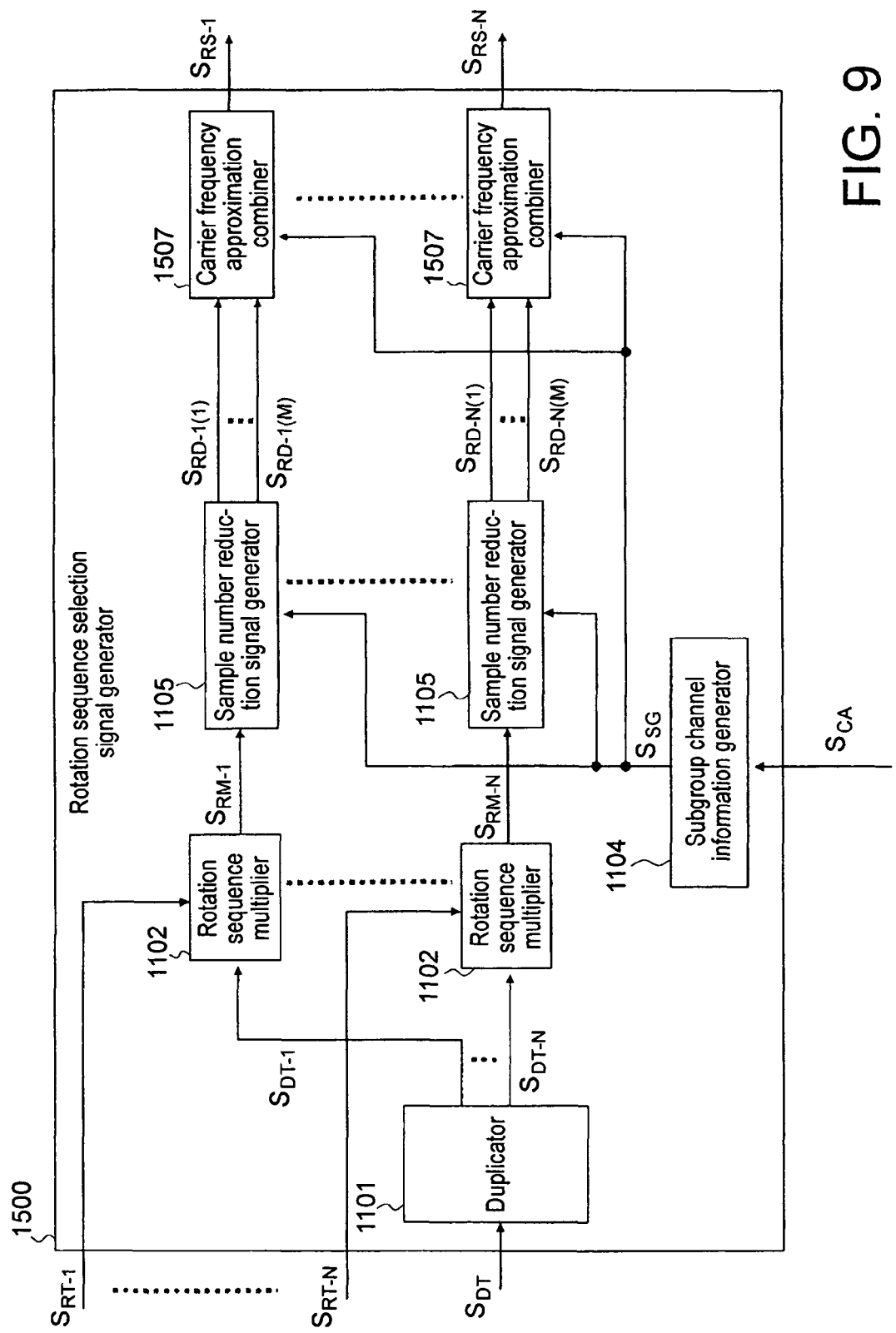
FIG. 9 is a block diagram showing the configuration of a rotation sequence selection signal generator in a signal generating apparatus according to a second exemplary embodiment of the present invention.

The signal generating apparatus of the second exemplary embodiment of the present invention is such that the configuration of the rotation sequence selection signal generator in the signal generating apparatus of the first exemplary embodiment shown in FIG. 3 is changed, and other parts are similar to those of the first exemplary embodiment. FIG. 9 shows rotation sequence selection signal generator 1500 used in the second exemplary embodiment.

Rotation sequence selection signal generator 1500 used in the second exemplary embodiment includes: as shown in FIG. 9, duplicator 1101 for duplicating data symbol sequence $S_{DT}$ to output N data symbol sequences $S_{DT-1}$ to $S_{DT-N}$; N pieces of rotation sequence multipliers 1102 for multiplying data symbol sequences $S_{DT-1}$ to $S_{DT-N}$ and phase rotation sequences $S_{RT-1}$ to $S_{RT-N}$ corresponding thereto to output phase multiplication data sequences $S_{RM-1}$ to $S_{RM-N}$; subgroup channel information generator 1104 for generating subgroup channel information $S_{SG}$ on the basis of frequency assignment information $S_{CA}$; N pieces of sample number reduction signal generators 1105 for generating sample number reduction signal sequences $S_{RD-1(1)}$ to $S_{RD-1(M)}$, . . . , $S_{RD-N(1)}$ to $S_{RD-N(M)}$ on the basis of phase multiplication data sequences $S_{RM-1}$ to $S_{RM-N}$ and subgroup channel information $S_{SG}$; and N pieces of carrier frequency approximation combiners 1507 for generating rotation sequence selection signals $S_{RS-1}$ to $S_{RS-N}$ on the basis of sample number reduction signal sequences $S_{RD-1(1)}$ to $S_{RD-N(M)}$, . . . , $S_{RD-N(1)}$ to $S_{RD-N(M)}$ and subgroup channel information $S_{SG}$ to output those rotation sequence selection signals. Since duplicator 1101, rotation sequence multipliers 1102, subgroup channel information generator 1104, and sample number reduction signal generators 1105 are the same as those used in rotation sequence selection signal generator 1005 in the first exemplary embodiment shown in FIG. 4, their description will be omitted. Namely, rotation sequence selection signal generator 1500 of the second exemplary embodiment is of the configuration in which carrier frequency approximation combiner 1507 is provided in place of the envelope approximation combiner at rotation sequence selection signal generator 1005 in the first exemplary embodiment shown in FIG. 4. The configuration of subgroup generated at subgroup channel information generator 1104 is similar to that shown in FIG. 5 also in this second exemplary embodiment.

Figure 10:
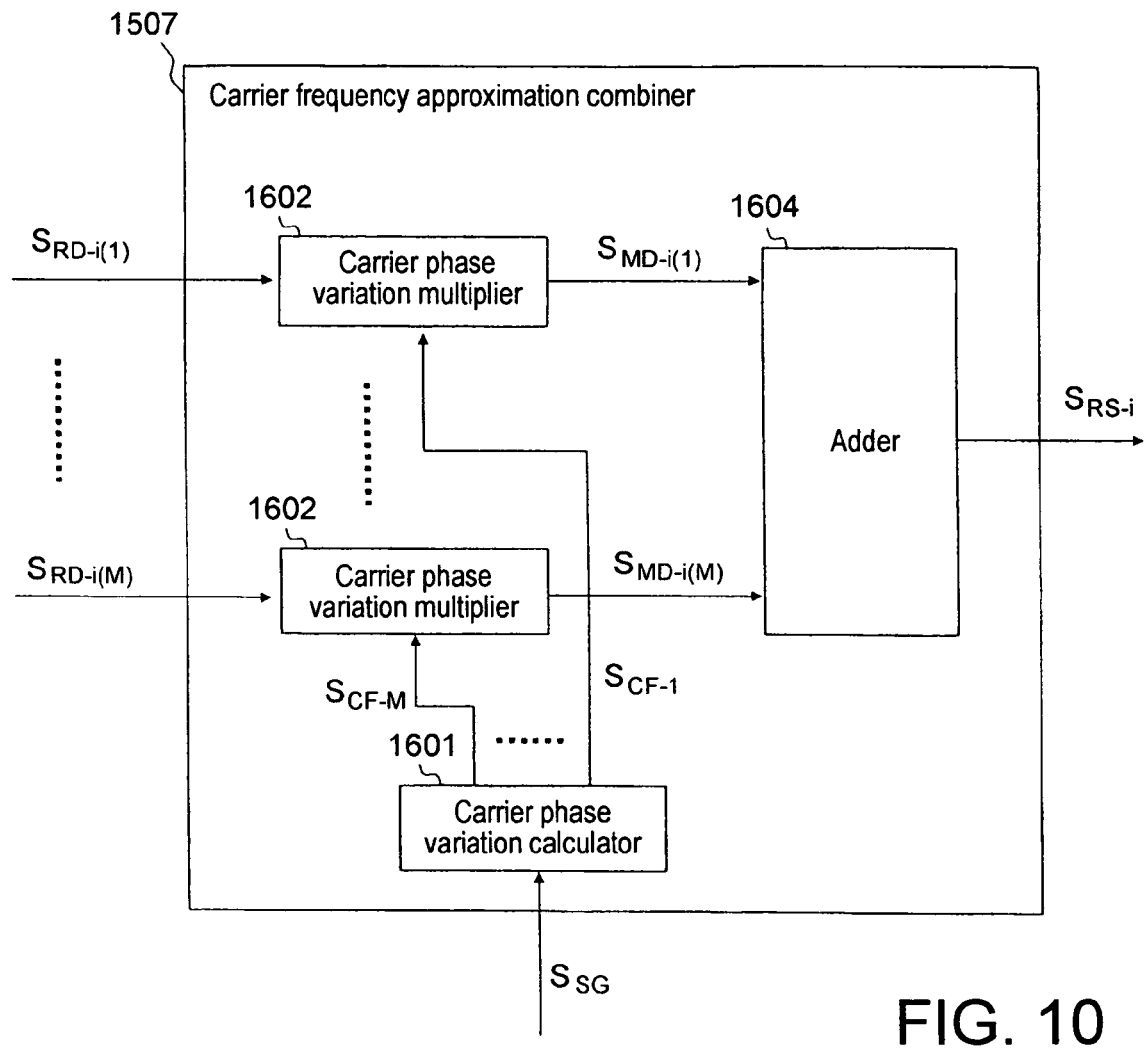
FIG. 10 is a block diagram showing the configuration of a carrier frequency approximation combiner in the rotation sequence selection signal generator shown in FIG. 9.

Since N carrier frequency approximation combiners 1507 provided are all of the same configuration, when attention is drawn to the i-th ($1 \leq SN$) carrier frequency approximation combiner 1507, the i-th carrier frequency approximation combiner 1507 includes: as shown in FIG. 10, carrier phase variation calculator 1601 for generating carrier frequency phase sequences $S_{CF-1}$ to $S_{CF-M}$ on the basis of subgroup channel information $S_{SG}$; M pieces of carrier phase variation multipliers 1602 for generating carrier frequency multiplication data sequences $S_{MD-i(1)}$ to $S_{MD-i(M)}$ from sample number reduction signal sequences $S_{RD-i(1)}$ to $S_{RD-i(M)}$ and carrier frequency phase sequences $S_{CF-1}$ to $S_{CF-M}$; and adder 1604 for adding carrier frequency multiplication data sequences $S_{MD-i(1)}$ to $S_{MD-i(M)}$ to output the i-th rotation sequence selection signal $S_{RS-i}$.

Carrier frequency approximation combiner 1507 in the second exemplary embodiment will be described below in more detail.

When carrier phase variation calculator 1601 receives subgroup channel information $S_{SG}$ as an input, it generates M carrier frequency phase sequences $S_{CF-1}$ to $S_{CF-M}$ each including G samples corresponding to phase variations of the center frequencies of the first to the M-th subgroups. Here, the j-th ($1 \leq j \leq M$) carrier frequency phase sequence $S_{CF-j}$ is delivered to the j-th carrier phase variation multiplier 1602.

M carrier phase variation multipliers 1602 provided are all of the same configuration. Here, when attention is drawn to the i-th ($1 \leq i \leq M$) carrier phase variation multiplier, the i-th carrier phase variation multiplier 1602 receives, as inputs, the j-th carrier frequency phase sequence $S_{CF-j}$ and the (M×(i−1)+j)-th sample number reduction signal sequence $S_{RD-i(j)}$ to sequentially multiply samples forming the carrier frequency phase sequence every sample of the sample number reduction signal sequences to generate the (M×(i−1)+j)-th carrier frequency multiplication data sequence $S_{MD-i(j)}$ including G samples to output the carrier frequency multiplication data sequence thus generated to adder 1604. The adder 1604 receives, as inputs, carrier frequency multiplication data sequences $S_{MD-i(i)}$ to $S_{MD-i(M)}$ from M carrier phase variation multipliers 1602 to add, every sample, these carrier frequency multiplication data sequences $S_{MD-i(1)}$ to $S_{MD-i(M)}$ to output the data sequence thus added as the i-th rotation sequence selection signal $S_{RS-i}$ including G samples.

Also in the second exemplary embodiment, in the case where one user uses a portion of subcarriers within the entire band of a large number subcarriers where data symbols are multiplexed, the number of samples of a signal used in selecting the phase rotation sequence of which peak power becomes minimum can be reduced by the above-described operation as compared to the number of samples of actual transmission signals. For this reason, it is possible to generate a multicarrier signal of which peak power has been reduced by lesser computational amount as compared to the related art method.

Third Exemplary Embodiment

Figure 11:
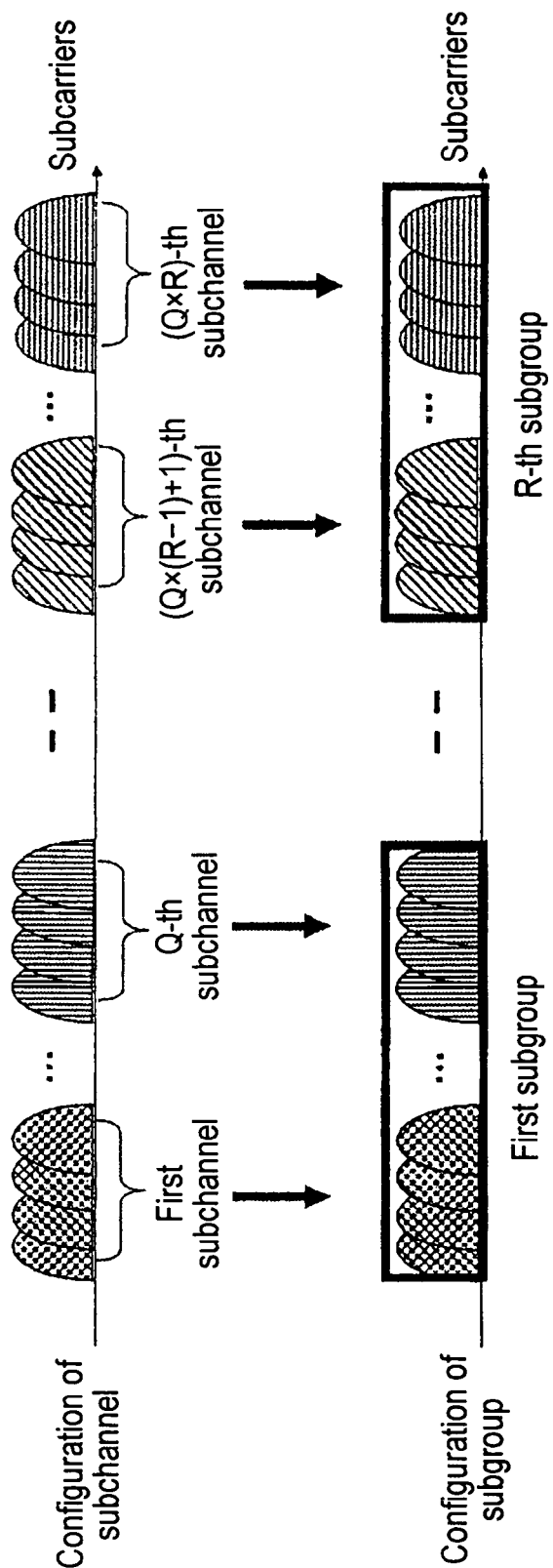
FIG. 11 is a diagram showing the configuration of subgroup channel that a subgroup channel information generator generates in a signal generating apparatus according to a third exemplary embodiment of the present invention.

The signal generating apparatus of the third exemplary embodiment of the present invention is similar to the signal generating apparatuses of the above-described first and second exemplary embodiments as the apparatus configuration, but differs from the cases of the first and second exemplary embodiments in connection with the configuration of subgroup that subgroup channel information $S_{SG}$ generated at the subgroup channel information generator indicates. FIG. 11 is a diagram for explaining the configuration of subgroup used in the third exemplary embodiment, and shows the configuration of subgroup which is indicated by subgroup channel information $S_{SG}$ that subgroup channel information generator 1104 generates.

In the third exemplary embodiment, it is assumed that Q and R are natural numbers to satisfy the relation expressed as Q×R=M, when subgroup channel information generator 1104 receives frequency assignment information $S_{CA}$ as an input, it outputs, as subgroup channel information $S_{SG}$, information corresponding to frequency channels of the first to the R-th subgroups assuming that the first to the (Q×R)-th subchannels are grouped every Q subchannels as shown in FIG. 11 so that R subgroups in total are formed. In this case, when j is assumed to be a natural number equal to R or less, the j-th subgroup is a frequency channel including: subcarriers forming the (Q×(j−1)+1)-th to the (Q×J)-th subchannels; and subcarriers of zero components between the (Q×(j−1)+1)-th subchannel to the (Q×j)-th subchannel.

Also in the third exemplary embodiment, in the case where one user uses a portion of subcarriers within the entire band of a large number of subcarriers where data symbols are multiplexed, the number of samples of signals used in selecting a phase rotation sequence of which peak power becomes minimum can be reduced by the above-described operation as compared to the number of samples of actual transmission signals. For this reason, it is possible to generate a multicarrier signal of which peak power has been reduced by lesser computational amount as compared to the related art method.

Fourth Exemplary Embodiment

Figure 12:
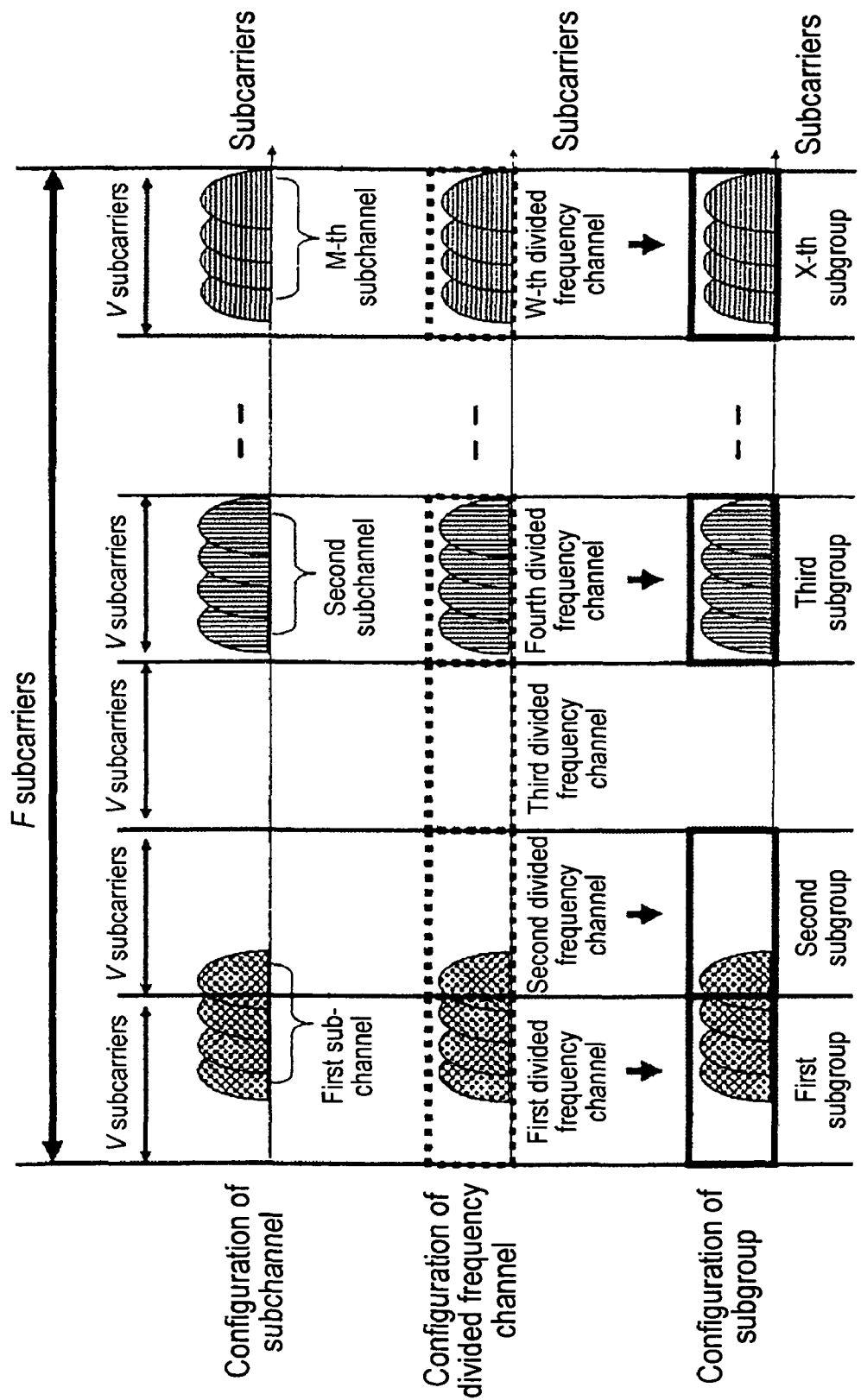
FIG. 12 is a diagram showing the configuration of subgroup channel that a subgroup channel information generator generates in a signal generating apparatus according to a fourth exemplary embodiment of the present invention.

The signal generating apparatus of the fourth exemplary embodiment of the present invention is similar to the signal generating apparatuses of the above-described first and second exemplary embodiments as the apparatus configuration, but differs from the cases of the first to the third exemplary embodiments in connection with the configuration of subgroup that subgroup channel information $S_{SG}$ generated at the subgroup channel information generation indicates. FIG. 12 is a diagram for explaining the configuration of subgroup used in the fourth exemplary embodiment, and shows the configuration of subgroup indicated by subgroup channel information $S_{SG}$ that subgroup channel information generator 1104 generates in the signal generating apparatus of the fourth exemplary embodiment.

When subgroup channel information generator 1104 receives, as an input, frequency assignment information $S_{CA}$, it serves to divide a frequency channel including F subcarriers every V successive subcarriers as shown in FIG. 12 to generate the first to the W-th divided frequency channels, and extract, as the first to the X-th subgroups, a divided frequency channel including subcarriers that frequency assignment information $S_{CA}$ indicates from the first to the W-th divided frequency channels to output, as subgroup channel information $S_{SG}$, information corresponding to frequency channels of the first to the X-th subgroups. Here, F is the number of points of inverse fast Fourier transform at the IFFT unit similarly to the case of the first exemplary embodiment. V and W are natural numbers to satisfy the relation expressed as V×W=F, and X is a natural number equal to W or less.

Also in the fourth exemplary embodiment, in the case where one user uses a portion of subcarriers within the entire band of a large number of subcarriers where data symbols are multiplexed, the number of samples of signals used in selecting a phase rotation sequence of which peak power becomes minimum can be reduced by the above-described operation as compared to the number of samples of actual transmission signals. For this reason, it is possible to generate a multicarrier signal of which peak power has been reduced by lesser computational amount as compared to the related art method.

Fifth Exemplary Embodiment

Figure 13:
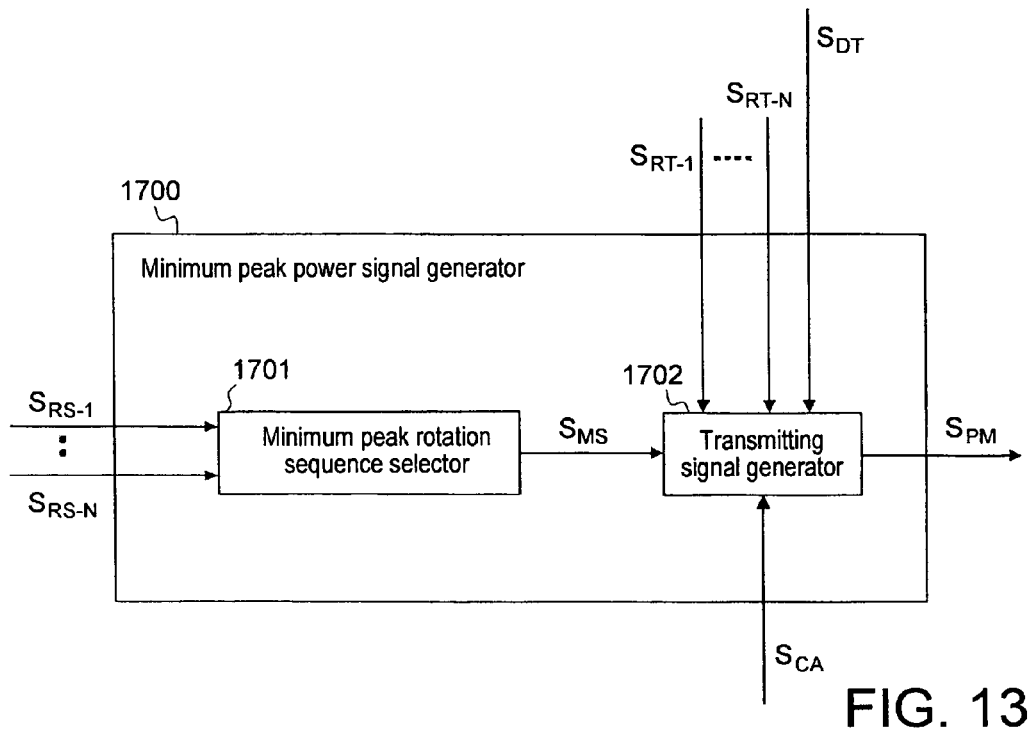
FIG. 13 is a block diagram showing the configuration of a minimum peak power signal generator in a signal generating apparatus according to a fifth exemplary embodiment of the present invention.

The signal generating apparatus of the fifth exemplary embodiment of the present invention is such that the configuration of the minimum peak power signal generator in the signal generating apparatuses of the above-described first to fourth exemplary embodiments is changed, and other parts are similar to those of the case of the first to fourth exemplary embodiments. FIG. 13 shows minimum peak power signal generator 1700 used in the fifth exemplary embodiment. Processing at other functional blocks except for minimum peak power signal generator 1700 are the same as those of the first to fourth exemplary embodiments. It is to be noted that, in the present exemplary embodiment, the configuration of subgroup generated in subgroup channel information generator 1700 may be caused to be any one of the configurations shown in FIGS. 5, 11 and 12.

Figure 14:
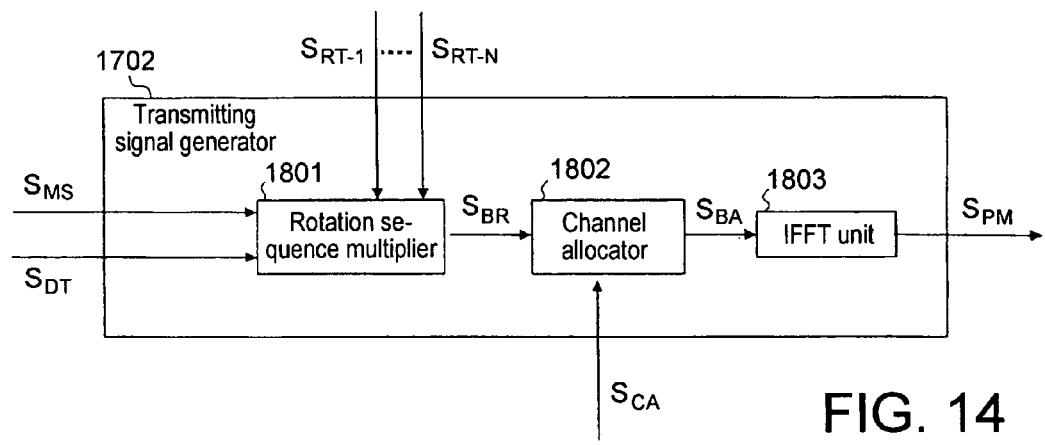
FIG. 14 is a block diagram showing the configuration of a transmission signal generator in the minimum peak power signal generator shown in FIG. 13.

Minimum peak power signal generator 1700 includes: as shown in FIG. 13, minimum peak rotation sequence selector 1701 supplied with rotation sequence selection signals $S_{RS-1}$ to $S_{RS-N}$ to select optimum rotation sequence selection information $S_{MS}$ from those signals to output the optimum rotation sequence selection information thus selected; and transmission signal generator 1702 supplied with phase rotation sequences $S_{RT-1}$ to $S_{RT-N}$, optimum rotation sequence selection information $S_{MS}$, data symbol sequence $S_{DT}$ and frequency assignment information $S_{CA}$ to output a transmission signal, i.e., multicarrier signal $S_{PM}$. Transmission signal generator 1702 includes: as shown in FIG. 14, rotation sequence multiplier 1801 for generating carrier phase rotation multiplication data sequence $S_{BR}$ from phase rotation sequences $S_{RT-1}$ to $S_{RT-N}$, optimum rotation sequence selection information $S_{MS}$ and data symbol sequence $S_{DT}$; channel allocator 1802 for generating an IFFT signal $S_{BA}$ including F subcarriers from frequency assignment information $S_{CA}$ and carrier phase rotation multiplication data sequence $S_{BR}$; and IFFT unit 1803 for performing inverse fast Fourier transform with respect to IFFT signal $S_{BA}$ to generate a transmission signal (multicarrier signal $S_{PM}$).

In this minimum peak power signal generator 1700, when the first to the N-th rotation sequence selection signals $S_{RS-1}$ to $S_{RS-N}$ are delivered thereto, minimum peak rotation sequence selector 1701 outputs, to transmission signal generator 1702, as optimum rotation sequence selection information $S_{MS}$, a number corresponding to a rotation sequence selection signal of which peak power becomes minimum from the first to the N-th rotation sequence selection signals $S_{RS-1}$ to $S_{RS-N}$. When transmission signal generator 1702 receives, as inputs, optimum rotation sequence selection information $S_{MS}$, the first to the N-th phase rotation sequences $S_{RT-1}$ to $S_{RT-N}$, data symbol sequence $S_{DT}$ and frequency assignment information $S_{CA}$, rotation sequence multiplier 1801 of transmission signal generator 1702 sequentially multiplies data symbols forming data symbol sequence $S_{DT}$ by phase rotation coefficients forming the phase rotation sequence corresponding to optimum rotation sequence selection information $S_{MS}$ to output carrier phase rotation multiplication data $S_{BR}$ including E pieces of data to channel allocator 1802. Channel allocator 1802 outputs, to IFFT unit 1803, as IFFT signal $S_{BA}$, a signal including F subcarriers which is obtained by sequentially multiplying data symbols of carrier phase rotation multiplication data $S_{BR}$ with respect to E subcarriers corresponding to frequency assignment information $S_{CA}$, and causing the remaining (F-E) pieces of subcarrier components to be zero. IFFT unit 1803 performs F-points inverse fast Fourier transform with respect to IFFT signal $S_{BA}$ to thereby generate a transmission signal on the time axis including F samples, i.e., multicarrier signal $S_{PM}$.

Also in the fifth exemplary embodiment, in the case where one user uses a portion of subcarriers within the entire band of a large number of subcarriers where data symbols are multiplexed, the number of samples of signals used in selecting the phase rotation sequence of which peak power becomes minimum can be reduced by the above-described operation as compared to the number of samples of actual transmission signals. For this reason, it is possible to generate a multicarrier signal of which peak power has been reduced by lesser computational amount as compared to the related art method.

The previously described signal generating apparatuses of the first to the fifth exemplary embodiments may be constructed in such a manner that the above-described respective components are provided as individual hardware devices, or may be realized by a CPU operative in accordance with a program. In that case, program for executing the above-described signal generation method is stored into a storage device such as a magnetic disc or semiconductor memory, etc., and is read into the CPU constituting the signal generating apparatus, thus to control the operation of the signal generating apparatus. Namely, the signal generating apparatus according to the present invention may be constructed by using a computer including a storage device.

The invention claimed is:

1. A signal generating apparatus adapted for outputting a multicarrier signal in which data are multiplexed with respect to a plurality of subcarriers, comprising:
    a data symbol information generator for generating, as resource assignment information, information indicating E subcarriers assigned within all F subcarriers which are equal to the number of points of inverse Fourier transform, F being an integer equal to 2 or more, and E being an integer equal to F or less;
    a phase rotation sequence generator for receiving, as an input, the resource assignment information to extract, from the resource assignment information, the number E of the assigned subcarriers to generate first to N-th phase rotation sequences each of which includes E phase rotation coefficients, N being an integer equal to 2 or more;
    a data sequence generator for receiving, as an input, the resource assignment information to extract, from the resource assignment information, the number E of the assigned subcarriers to generate one data symbol sequence including E data symbols;
    a rotation sequence selection signal generator for receiving, as inputs, the first to the N-th phase rotation sequences, the data symbol sequence and the resource assignment information to generate, respectively in correspondence with the first to the N-th phase rotation sequences, the first to the N-th rotation sequence selection signal sequences on a time axis each of which includes G samples, G being a natural number less than F; and
    a minimum peak power signal generator for receiving, as inputs, the first to the N-th rotation sequence selection signal sequences, the first to the N-th phase rotation sequences, the data symbol sequence and the resource assignment information to select, as an optimum rotation sequence selection signal sequence, a rotation sequence selection signal sequence of which peak power becomes minimum among the first to the N-th rotation sequence selection signal sequences, and generating a transmission signal on the time axis including F samples by using the phase rotation sequence corresponding to the optimum rotation sequence selection signal sequence, the data symbol sequence and the resource assignment information.

2. The signal generating apparatus according to claim 1, further comprising a sample number reduction signal generator wherein the sample number reduction signal generator comprises:

a subgroup signal generator for receiving, as inputs, the resource assignment information, the i-th phase multiplication data sequence and the group assignment information to output group assignment information corresponding to the first to the T-th group channels generated on the basis of the resource assignment information, and generating the first to the T-th group data signal sequences each including P subcarriers in a manner to allow the i-th phase multiplication data sequence to correspond to the group channel information, P being a natural number equal to G or less, and satisfying the relation expressed as P×T≧E;

a zero component interpolator for being supplied with the first to the T-th group data signal sequences to extrapolate (G−P) pieces of subcarriers of zero components in total with respect to frequencies of both ends in each group signal sequence to generate the first to the T-th zero interpolation signal sequences including G subcarriers; and a reduction-type IFFT unit for being supplied with the first to the T-th zero interpolation signal sequences to generate the first to the T-th sample number reduction signal sequences on the time axis each including G samples from the first to the T-th zero interpolation signal sequences by inverse Fourier transform of G-points in which the center frequency of inverse Fourier transform is caused to be respective center frequencies of the first to the T-th zero interpolation signal sequences.

3. The signal generating apparatus according to claim 1, wherein a configuration of group channels generated on the basis of the resource assignment information in the rotation sequence selection signal generator is a configuration including the first to the M-th subchannels each including D successive subcarriers that the resource assignment information indicates.

4. The signal generating apparatus according to claim 1, wherein a configuration of group channels generated on the basis of the resource assignment information in the rotation sequence selection signal generator is a configuration including the first to the R-th group channels in which a frequency channel including (D×Q) pieces of subcarriers included in the (Q×(j−1)+1)-th to the (j×Q)-th subchannels at the first to the M-th subchannels including D successive subcarriers that the resource assignment information indicates, and subcarriers of zero components between the (Q×(j−1)+1)-th subchannel and the (j×Q)-th subchannel is caused to be the j-th group channel, j being a natural number equal to R or less, and Q and R being natural numbers which satisfy (Q×R)=M.

5. The signal generating apparatus according to claim 1, wherein a frequency channel including F subcarriers is divided so that the first to the W-th divided frequency channels including V subcarriers are formed, and group channels generated on the basis of the resource assignment information at the rotation sequence selection signal generator are the first to the X-th group channels corresponding to the divided frequency channels including subcarriers that the resource assignment information indicates, V and W being natural numbers to satisfy V×W=F, and X being a natural number equal to W or less.

6. The signal generating apparatus according to claim 1, wherein the rotation sequence selection signal generator comprises:

a rotation sequence multiplier for receiving, as inputs, the first to the N-th phase rotation sequences and the data symbol sequence to respectively multiply the first to the E-th data symbols forming the data symbol sequence by the first to the E-th phase rotation coefficients forming the i-th phase rotation sequence to generate the i-th phase multiplication data sequence including the first to the E-th phase multiplication data, i being a natural number equal to N or less;

a sample number reduction signal generator for receiving, as inputs, the i-th phase multiplication data sequence and the resource assignment information to output information corresponding to first to T-th group channels generated on the basis of the resource assignment information, and generating the (T×(i−1)+1)-th to the (T×i)-th sample number reduction signal sequences including G samples, which are caused to respectively correspond to the first to the T-th group channels to output the these sample number reduction signal sequences thus generated; and an envelope approximation combiner for receiving, as inputs, the (T×(i−1)+1)-th to the (T×i)-th sample number reduction signal sequences to add absolute values every sample at the (T×(i−1)+1)-th to the (T×i)-th sample number reduction signal sequences each including G samples to generate the i-th rotation sequence selection signal sequence including G samples.

7. The signal generating apparatus according to claim 6, wherein the sample number reduction signal generator comprises:

a subgroup signal generator for receiving, as inputs, the resource assignment information, the i-th phase multiplication data sequence and the group assignment information to output group assignment information corresponding to the first to the T-th group channels generated on the basis of the resource assignment information, and generating the first to the T-th group data signal sequences each including P subcarriers in a manner to allow the i-th phase multiplication data sequence to correspond to the group channel information, P being a natural number equal to G or less, and satisfying the relation expressed as P×T≧E;

a zero component interpolator for being supplied with the first to the T-th group data signal sequences to extrapolate (G−P) pieces of subcarriers of zero components in total with respect to frequencies of both ends in each group signal sequence to generate the first to the T-th zero interpolation signal sequences including G subcarriers; and a reduction-type IFFT unit for being supplied with the first to the T-th zero interpolation signal sequences to generate the first to the T-th sample number reduction signal sequences on the time axis each including G samples from the first to the T-th zero interpolation signal sequences by inverse Fourier transform of G-points in which the center frequency of inverse Fourier transform is caused to be respective center frequencies of the first to the T-th zero interpolation signal sequences.

8. The signal generating apparatus according to claim 6, wherein a configuration of group channels generated on the basis of the resource assignment information in the rotation sequence selection signal generator is a configuration including the first to the M-th subchannels each including D successive subcarriers that the resource assignment information indicates.

9. The signal generating apparatus according to claim 6, wherein a configuration of group channels generated on the basis of the resource assignment information in the rotation sequence selection signal generator is a configuration including the first to the R-th group channels in which a frequency channel including (D×Q) pieces of subcarriers included in the (Q×(j−1)+1)-th to the (j×Q)-th subchannels at the first to the M-th subchannels including D successive subcarriers that the resource assignment information indicates, and subcarriers of zero components between the (Q×(j−1)+1)-th subchannel and the (j×Q)-th subchannel is caused to be the j-th group channel, j being a natural number equal to R or less, and Q and R being natural numbers which satisfy (Q×R)=M.

10. The signal generating apparatus according to claim 6, wherein a frequency channel including F subcarriers is divided so that the first to the W-th divided frequency channels including V subcarriers are formed, and group channels generated on the basis of the resource assignment information at the rotation sequence selection signal generator are the first to the X-th group channels corresponding to the divided frequency channels including subcarriers that the resource assignment information indicates, V and W being natural numbers to satisfy V×W=F, and X being a natural number equal to W or less.

11. The signal generating apparatus according to claim 1, wherein the rotation sequence selection signal generator comprises:
a rotation sequence multiplier for receiving, as inputs, the first to the N-th phase rotation sequences and the data symbol sequence to respectively multiply the first to the E-th data symbols forming the data symbol sequences by the first to the E-th phase rotation coefficients forming the i-th phase rotation sequence to generate the i-th phase multiplication data sequence including the first to the E-th phase multiplication data, i being an integer equal to N or less;
a sample number reduction signal generator for receiving, as inputs, the i-th phase multiplication data sequence and the resource assignment information to output information corresponding to first to T-th group channels generated on the basis of the resource assignment information, and generating the (T×(i−1)+1)-th to the (T×i)-th sample number reduction signal sequences including G samples, which are caused to respectively correspond to the first to the T-th group channels to output these sample number reduction signal sequences thus generated; and
a carrier frequency approximation combiner for receiving, as inputs, the (T×(i−1)+1)-th to the (T×i)-th sample number reduction signal sequences and the group assignment information to multiply the (T×(i−1)+1)-th to the (T×i)- th sample number reduction signal sequences each including G samples by phase rotation coefficients respectively corresponding to carrier frequencies of the first to the T-th group channels to thereby generate the (T×(i−1)+1)-th to the (T×i)-th carrier frequency multiplication signals, and adding, every sample, the (T×(i−1)+1)-th to the (T×i)-th carrier frequency multiplication signals to generate the i-th rotation sequence selection signal sequence including G samples.

12. The signal generating apparatus according to claim 11, wherein the sample number reduction signal generator comprises:
a subgroup signal generator for receiving, as inputs, the resource assignment information, the i-th phase multiplication data sequence and the group assignment information to output group assignment information corresponding to the first to the T-th group channels generated on the basis of the resource assignment information, and generating the first to the T-th group data signal sequences each including P subcarriers in a manner to allow the i-th phase multiplication data sequence to correspond to the group channel information, P being a natural number equal to G or less, and satisfying the relation expressed as P×T≧E;
a zero component interpolator for being supplied with the first to the T-th group data signal sequences to extrapolate (G−P) pieces of subcarriers of zero components in total with respect to frequencies of both ends in each group signal sequence to generate the first to the T-th zero interpolation signal sequences including G subcarriers; and
a reduction-type IFFT unit for being supplied with the first to the T-th zero interpolation signal sequences to generate the first to the T-th sample number reduction signal sequences on the time axis each including G samples from the first to the T-th zero interpolation signal sequences by inverse Fourier transform of G-points in which the center frequency of inverse Fourier transform is caused to be respective center frequencies of the first to the T-th zero interpolation signal sequences.

13. The signal generating apparatus according to claim 11, wherein a configuration of group channels generated on the basis of the resource assignment information in the rotation sequence selection signal generator is a configuration including the first to the M-th subchannels each including D successive subcarriers that the resource assignment information indicates.

14. The signal generating apparatus according to claim 11, wherein a configuration of group channels generated on the basis of the resource assignment information in the rotation sequence selection signal generator is a configuration including the first to the R-th group channels in which a frequency channel including (D×Q) pieces of subcarriers included in the (Q×(j−1)+1)-th to the (j×Q)-th subchannels at the first to the M-th subchannels including D successive subcarriers that the resource assignment information indicates, and subcarriers of zero components between the (Q×(j−1)+1)-th subchannel and the (j×Q)-th subchannel is caused to be the j-th group channel, j being a natural number equal to R or less, and Q and R being natural numbers which satisfy (Q×R)=M.

15. The signal generating apparatus according to claim 11, wherein a frequency channel including F subcarriers is divided so that the first to the W-th divided frequency channels including V subcarriers are formed, and group channels generated on the basis of the resource assignment information at the rotation sequence selection signal generator are the first to the X-th group channels corresponding to the divided frequency channels including subcarriers that the resource assignment information indicates, V and W being natural numbers to satisfy V×W=F, and X being a natural number equal to W or less.

16. A signal generation method of outputting a multicarrier signal where data are multiplexed with respect to plural subcarriers, the signal generation method comprising:
generating, as resource assignment information, information indicating E subcarriers assigned within all F subcarriers which are equal to the number of points of inverse Fourier transform, F being an integer equal to 2 or more, and E being an integer equal to F or less;

extracting the number of E of the assigned subcarriers on the basis of the resource assignment information to generate the first to the N-th phase rotation sequences each including E phase rotation coefficients, N being an integer equal to 2 or more;

extracting the number E of the assigned subcarriers on the basis of the resource assignment information to generate one data symbol sequence including E data symbols;

generating, respectively in correspondence with the first to the N-th phase rotation sequences, the first to the N-th rotation sequence selection signal sequences on a time axis each including G samples on the basis of the first to the N-th phase rotation sequences, the data symbol sequence and the resource assignment information, G being a natural number less than F; and selecting, as an optimum rotation sequence selection signal sequence, a rotation sequence selection signal sequence of which peak power becomes minimum of the first to the N-th rotation sequence selection signal sequences on the basis of the first to the N-th rotation sequence selection signal sequences, the first to the N-th phase rotation sequences, the data symbol sequence and the resource assignment information to generate a transmission signal on the time axis including F samples by using the phase rotation sequence corresponding to the optimum rotation sequence selection signal sequence, the data symbol sequence and the resource assignment information.

17. A non-transitory computer readable recording medium in which there is stored a program for allowing a computer to output a multicarrier signal where data are multiplexed with respect to plural subcarriers to execute:

a processing to generate, as resource assignment information, information indicating E subcarriers assigned within all F subcarriers which are equal to the number of points of inverse Fourier transform, F being an integer equal to 2 or more, and E being an integer equal to F or less;

a processing to extract the number E of the assigned subcarriers on the basis of the resource assignment information to generate the first to the N-th phase rotation sequences each including E phase rotation coefficients, N being an integer equal to 2 or more;

a processing to extract the number E of subcarriers assigned on the basis of the resource assignment information to generate one data symbol sequence including E data symbols;

a processing to generate, respectively in correspondence with the first to the N-th phase rotation sequences, the first to the N-th rotation sequence selection signal sequences on a time axis, each including G samples on the basis of the first to the N-th phase rotation sequences, the data symbol sequence and the resource assignment information, G being a natural number less than F; and a processing to select, as an optimum rotation sequence selection signal sequence, a rotation sequence selection signal sequence of which peak power becomes minimum of the first to the N-th rotation sequence selection signal sequences on the basis of the first to the N-th rotation sequence selection signal sequences, the first to the N-th phase rotation sequences, the data symbol sequence and the resource assignment information to generate a transmission signal on the time axis including F samples by using the phase rotation sequence corresponding to the optimum rotation sequence selection signal sequence, the data symbol sequence and the resource assignment information.

* * * * *